United States Patent
Wen et al.

(10) Patent No.: US 10,956,417 B2
(45) Date of Patent: Mar. 23, 2021

(54) DYNAMIC OPERATION SCHEDULING FOR DISTRIBUTED DATA PROCESSING

(71) Applicant: Oracle International Corporation, Redwood Shores, CA (US)

(72) Inventors: Jarod Wen, Hollis, NH (US); Sam Idicula, Santa Clara, CA (US); Nitin Kunal, Zurich (CH); Thomas Chang, Foster City, CA (US); Gong Zhang, Belmont, CA (US); Nipun Agarwal, Saratoga, CA (US); Farhan Tauheed, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 259 days.

(21) Appl. No.: 15/581,984

(22) Filed: Apr. 28, 2017

(65) Prior Publication Data
US 2018/0314733 A1 Nov. 1, 2018

(51) Int. Cl.
*G06F 16/2453* (2019.01)
(52) U.S. Cl.
CPC .............. *G06F 16/24542* (2019.01)
(58) Field of Classification Search
CPC .............. G06F 16/24542; G06F 16/24544
See application file for complete search history.

(56) References Cited

U.S. PATENT DOCUMENTS 6,549,931 B1   4/2003 Amor et al.
6,598,221 B1 *  7/2003 Pegatoquet .......... G06F 8/447
                                              714/E11.2
6,820,262 B1   11/2004 Tellez
(Continued)

FOREIGN PATENT DOCUMENTS

WO   WO-2016078592 A1 * 5/2016 ....... G06F 16/24542

OTHER PUBLICATIONS

Zhou et al., "Buffering Database Operations for Enhanced Instruction Cache Performance", SIGMOD 2004 Jun. 13-18, 2004, Paris, France. Copyright 2004, 12 pages.
(Continued)

*Primary Examiner* — Hosain T Alam
*Assistant Examiner* — Anthony G Gemignani
(74) *Attorney, Agent, or Firm* — Hickman Becker Bingham Ledesma LLP

(57) ABSTRACT

Techniques are provided for scheduling data operations for a given query based upon a query-cost model that analyzes the cost of scheduling data operations based upon their operation cost and the type of resources needed for the operation. In an embodiment, a database server receives a set of operations for a query. The database server determines a set of leaf operation nodes from the set of data operations, where the set of leaf operation nodes includes operation nodes that do not depend on the execution of other nodes within the set of data operations. The database server compares operation costs between the leaf operation nodes to determine which leaf operation node to insert into a scheduled order set. The database server inserts the leaf operation node into the scheduled order set. Then the database server iteratively determines new leaf operation nodes and performs cost analysis on remaining leaf operation nodes to generate a set of scheduled data operations.

10 Claims, 5 Drawing Sheets

(56) References Cited

U.S. PATENT DOCUMENTS

| | | | |
|---|---|---|---|
| 7,080,062 B1* | 7/2006 | Leung | G06F 16/24542 |
| 7,293,011 B1 | 11/2007 | Bedi et al. | |
| 2006/0080285 A1* | 4/2006 | Chowdhuri | G06F 16/24532 |
| 2009/0083212 A1* | 3/2009 | Bhattacharjee | G06F 16/284 |
| 2010/0191720 A1* | 7/2010 | Al-Omari | G06F 16/24542 |
| | | | 707/718 |
| 2010/0306219 A1* | 12/2010 | Sthanikam | G06F 16/8365 |
| | | | 707/759 |
| 2013/0312006 A1* | 11/2013 | Hardman | H04L 67/1008 |
| | | | 718/105 |
| 2015/0193500 A1* | 7/2015 | Aute | G06F 16/24542 |
| | | | 707/714 |
| 2016/0292227 A1* | 10/2016 | Jeong | G06F 16/24542 |

OTHER PUBLICATIONS

Xin et al., "Shark: SQL and Rich Analytics at Scale", SIGMOD'13, Jun. 22-27, 2013, New York, New York, USA. Copyright 2013 ACM, 12 pages.

Thusoo et al., "Hive A Warehousing Solution Over a MapReduce Framework", VLDB '09, Aug. 24-28, 2009, Lyon, France Copyright 2009, 4 pages.

Pirk et al., "CPU and Cache Efficient Management of Memory-Resident Databases", Proc.—Int. Conf. Data Eng., 12 pages, dated 2013.

P. G. Selinger et al., "Access Path Selection in a Relational Database Management System,", Proc. 1979 ACM SIGMOD Int. Conf. Manag. data, vol. 3, No. 2, pp. 23-34, 1979.

Neumann, Thomas, "Efficiently Compiling Efficient Query Plans for Modern Hardware", dated Aug. 29, Sep. 3, 2011, Proceedings of the VLDB Endowment, vol. 4, No. 9, 12 pages.

N. Conway, "Query Execution Techniques in PostgreSQL,", dated 2007, 63 pages.

Graefe et al., "The Volcano Optimizer Generator: Extensibility and Efficient Search", in Proceedings of IEEE 9th International Conference on Data Engineering, pp. 209-218, dated 1993.

Dittrich et al., "Efficient Big Data Processing in Hadoop MapReduce", Aug. 27, 2012, Istanbul, Turkey. Proceedings of the VLDB Endowment, vol. 5, No. 12, 2 pages.

Colgan, Maria, "In Memory Parallel Execution in Oracle Database 11gR2", Functionality, dated Sep. 27, 2009, 4 pages.

* cited by examiner

DYNAMIC OPERATION SCHEDULING FOR DISTRIBUTED DATA PROCESSING

FIELD OF THE DISCLOSURE

Embodiments relate generally to database systems and, more specifically, to generating an order of operations for requested queries based on overlapping execution costs of multiple operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database queries are processed as a flow of database operations such as, group-by, join, and partition operations. The flow of database operations may be represented as a directed-acyclic-graph (DAG) where each node in the graph represents a data operation and edges of the DAG represent input and output flows between operations. In order to execute a query, a query execution plan is generated that describes a specific execution order for each of the data operations. A particular query however, may be executed using several different execution orders. For instance, a scheduling order for a query may be based on a topological sorted order, where data dependency of each database operation dictates the scheduling order. Other types of execution orders may implement defined heuristic rules that describe ordering scenarios for different data operations.

However, determining an efficient scheduling order for each type of query may be difficult. Typically, database systems implement naive scheduling based upon general rules, such as generating a topological scheduling order. Naive scheduling order methods may result in processing time bottlenecks based on data operations that require large network transfers like moving data from one database server to another database server. Such bottlenecks prevent other data operations from being processed until the data operations with large network processes are complete. Thus there is a need for an optimized scheduling strategy that generates a scheduling order to reduce bottlenecks caused by long data operations.

Figure 1:
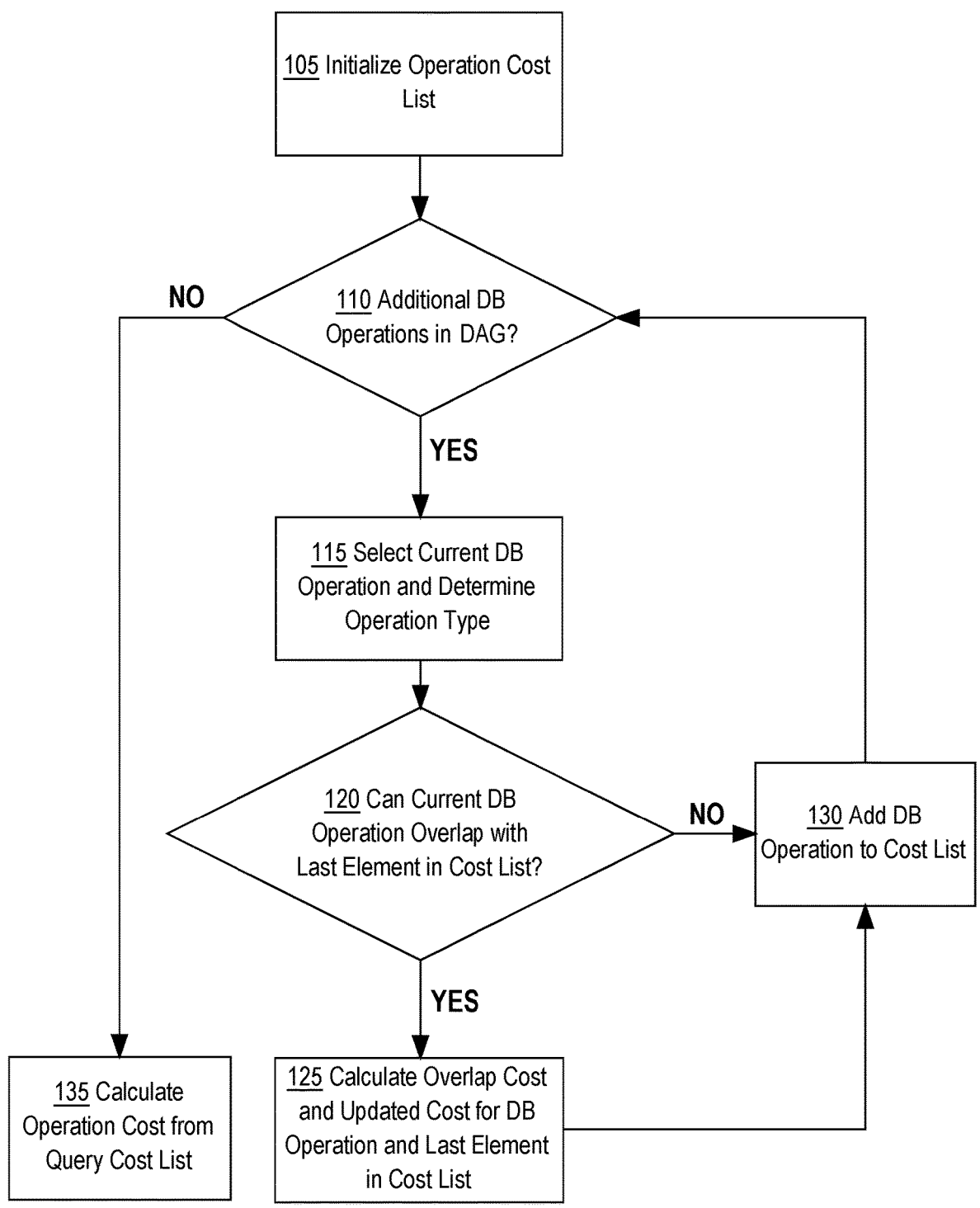
FIG. 1 depicts example embodiment of calculating operation cost for a given query based on query-level cost model.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

General Overview

A query may have many data operations that may be scheduled for execution in different ways. Determining an optimal scheduling order for data operations may be based on a time cost of each operation and type of operation performed by the data operation node. Time cost for a data operation is a measurement of time to process the data operation. In conjunction with the time cost for each data operation, the type of data operation may be useful in determining the final scheduling order based on time cost and dependencies between the data operations. For example, if a first node is a data operation that includes a networking process that consumes a large amount of time, then the query scheduler may schedule data operations that are not dependent on the network component of the first node, in order to process the other data operations while the networking process of the first node is still running. This strategy optimizes scheduling data operations in a query by overlapping specific data operations in order to save query time cost.

Techniques are provided for scheduling data operations based upon an operation cost model that analyzes the operation cost of scheduled data operations decided by their operation costs and data operation types. A database server receives a set of operations for a query, where the received set of operations may be represented as operation nodes within a data structure that represents each data processing step for the query. The database server calculates an operation cost and decides an operation type for each operation node in the set of operations. The operation cost represents the time it takes to perform a data operation. The operation type represents the major type of computing resource used to process the operation.

After determining the time cost and type for each operation node, the database server determines a set of leaf operation nodes from the set of data operations, where the set of leaf operation nodes includes operation nodes that do not depend on the execution of other nodes within the set of data operations. After determining the set of leaf operation nodes, the database server selects a leaf operation node as the first operation to be performed in a candidate scheduling order, based on some heuristic rules. Depending on the heuristics, more than one leaf operation nodes could be selected to create multiple candidate scheduling orders.

The database server is configured to iteratively perform operation cost analysis on the remaining operation nodes by determining a new set of leaf operation nodes from the remaining operation nodes. For each of the leaf operation nodes, the database server creates a new candidate scheduling order, and determines the operation cost value of this new scheduling order by scheduling this leaf operation node as the next operation of the given candidate scheduling order. The operation cost value may be based upon a total time cost of executing the candidate scheduling order and the cost of the particular leaf operation node, where an overlapping cost may be calculated between the last node in the data operations scheduling order set and the particular leaf operation node. Based on heuristics, one or more of these new candidate scheduling orders could be pruned, so they will not be expanded further. One heuristic, for example, could be picking the candidate scheduling order with the minimum overall operation cost. Other heuristics could be applied based on the system requirement. After applying the heuristics, there could be one or more candidate scheduling orders left for further expanding. The database server then iteratively performs the operation cost analysis and on each remaining candidate scheduling orders, and the remaining operation nodes for that specific candidate scheduling order in the set of operation nodes.

Upon generating a complete set of data operations in the data operations scheduling order set for the received query, the database server sends the data operations scheduling order set to the query execution module.

General Architecture

Database applications interact with a database server by submitting to the database server commands that cause the database server to perform data manipulation operations on data stored in a database. For the database server to process the commands, the commands must conform to a database language supported by the database server. One database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

During the compilation of a query statement, the database server may perform a significant amount of preliminary work for the statement, such as parsing, semantic analysis, query plan generation, and database operation execution order generation. During the compilation of the query statement, a query operator tree may be generated to represent a query plan based upon data dependencies between the query operators that make up the query. Specifically, the query operator tree is composed of query operators, each representing a particular kind of database manipulation operation, herein referred to as database operation. During the compilation process, query operators are allocated, and each query operator is linked to zero, one, two, or more underlying query operators. The makeup of a query operator tree depends on the data dependencies of the query operators. Typically, a query operator tree is comprised of multiple levels. The lowest level contains leaf nodes, which are query operators that contain database operations that do not depend on completion of other database operations. Such leaf database operations may include accessing rows from a database or other data store. The top query operator, the root of the tree, produces the rows of the query that the query tree implements. The intermediate levels perform various transformations on rows produced by underlying query operators. Example database operations performed by query operators include scan, filter, group-by, expression, partition, join build, and many others.

A database operation may be configured to operate on a volume of input rows and/or output rows. Each database operation may have multiple instances or database operation tasks which are configured to operate on a volume of rows, but which operate on separate set of rows. For example, a scan operation may be configured to scan a same volume of rows from a table, with each task of the scan operation scanning a separate section of table. An aggregate operation may be configured to operate on input rows from a scan operation, each task of the aggregate operation operating on output rows generated by tasks of another operator, such as a scan operation.

The database server may be configured to generate a database operation execution order. A database operation execution order (herein referred to as execution order) is an execution order for query operators in the query operator tree. During the execution phase of a database command the database server executes the database operations described in the query operator tree in an order specified by the execution order. Methods for generating the execution order may implement time cost analysis and heuristic rules in order to determine an optimal execution based on total query execution time.

Two-Level Operation Cost Model

In an embodiment, the database server may be configured to determine the cost of processing each operation within a query plan and to determine the total cost of an execution order using a two-level operation cost model. The two-level operation cost model is a processing time analysis algorithm that first determines the operation cost for each database operation within the query plan and then determines the overall query cost based upon each of the database operations and their respective dependencies on other database operations within the query plan. The overall query cost is based upon the execution order and may be optimized if database operations that use different processing types are run in parallel in order to save overall operation costs.

Operation-Level Cost Model

In order to determine the overall query cost, each database operation, within the query plan, must be analyzed to determine the type of database operation being performed and the operation cost for each database operation. Any given query may be made up of multiple database operations, such as partitioning using a hash-based algorithm and sending data to different server nodes, computing hash values, and loading data from disk. In an embodiment, each type of database operation may be labeled with a specific cost type that refers to the type of resource being used during the database operation. For example, a partitioning operation that partitions data and sends partitions to other server nodes may be labeled as a NETWORK cost type because network components, within the server node, are being used to complete the database operation. Using direct memory access techniques, usage of CPU components for operations involving sending data to other server nodes may be minimized by directly accessing data from memory and sending the data to network components of a server node to package and send within network packets to a target server node.

For the purposes of overlapping database operations, each database operation is labeled with a specific cost type. If two database operations have different cost types and are not dependent on each other, then the two database operations may be overlapped because each operation is processed by different server node components, therefore the operations may be run in parallel. For example, a first database operation may be labeled with a NETWORK cost because the first database operation involves sending data from one server node to another server node using network components. A second database operation may be labeled with a CPU cost because the second database operation involves evaluating a set of data using a particular expression and uses the CPU components of the server node. Since the first database operation uses network components in the server node and the second database operation uses CPU components in the server node, the two database operations may be run in parallel.

However, certain database operations may include multiple types of computer costs. For example, a partition operation may include CPU resources to determine the partition and network resources to send partitions of data to destination server nodes. The CPU resources may make up 10% of the total time cost for the database operation, while the network time cost may make up the other 90% of the database operation. In an embodiment, labeling a cost type for a database operation may be based upon the type of resource that requires the most amount of time to complete. Using the previous example, the partition operation may incur 10% CPU cost and 90% NETWORK cost. Since the NETWORK cost makes up the majority of the time cost, the partition operation may be labeled with a NETWORK cost type. In an embodiment, the database server may be configured to label database operations with specific cost types including, but not limited to, NETWORK, CPU, and DRAM, where the NETWORK cost type refers to operating costs involving networking resources, CPU cost type refers to operating costs involving CPU resources, and DRAM cost type refers to operating costs involving accessing DRAM on the database server.

An efficient query plan may be defined as ordering database operations in such a way that execution time is minimized and the query is completed in the shortest amount of time. In order to determine whether a query plan has minimal operation cost, operation costs for each database operation needs to be evaluated in terms of execution time. In an embodiment, the database server may be configured to determine a numerical operation cost value for each database operation in the query plan. The numerical cost value may represent a specific unit of time, such as milliseconds, or any other configured unit of time. Database operations such as disk accesses, read/write operations, CPU cycles, and network packets being sent to other nodes are evaluated and assigned a specific operation cost value based on the specific unit of time.

In an embodiment, the database server calculates the numerical operation cost value for a specific database operation based on the numerical cost value associated with a specific operation type for the specific database operation. For example, the partition operation may include a CPU operation cost and a NETWORK operation cost. If the NETWORK operation cost constitutes the majority of the total operation cost for the database operation, then operation cost value is calculated as the amount of time it takes to complete the NETWORK portion of the database operation. By calculating the operation cost value as the operation cost for the operation type that takes the majority amount of time, each database operation is represented by the operation type designated as the majority operation type. If subsequent database operations in a query plan are to be overlapped for the purpose of conserving operation cost, then the overlap cost will likely be based upon the operation type that takes the majority amount to time to complete for a given database operation.

In other embodiments, the database server may calculate the numerical operation cost value for a specific database operation using the operation cost values for each cost type associated with a specific database operation. For example, the numerical cost value for the partition operation may be a sum of operation costs for both the CPU and NETWORK portions.

Query-Level Cost Model

The operator-cost model calculates the time cost of a single database operation. In order to calculate the time cost of a set of database operations that make up a query plan, overlapping operation costs of subsequent operations needs to be determined. In an embodiment, the query-level cost model is a cost model configured to calculate the operation cost of a set of ordered database operations, accounting for potential overlapping operation costs. Subsequent database operations in a set of ordered database operations may be overlapped based upon their cost type and cost value. The query-level cost model may be configured to determine the overlapping operation cost for each pair of neighboring database operations and recalculate their overall operation cost taking into account the overlap of neighboring database operations.

In an embodiment, the database server implements the query-level cost model by examining each pair of neighboring database operations in the set of ordered operations and determines whether the pair of neighboring database operations may be overlapped in terms of operation cost. If the pair of neighboring database operations may be overlapped, then an overlapping cost is calculated and labeled with a "HYBRID" cost type and the cost values of the neighboring database operations are recalculated, accounting for the hybrid cost. FIG. 1 is an example embodiment of calculating operation cost for a given query using the query-level cost model, where the input is a query plan as a set of ordered database operations.

At block 105 a query cost list is generated and populated with the first database operation from the set of ordered operations. The query cost list is used to store operation costs for each database operation including overlapping operation costs for neighboring database operations and recalculated operations costs that account for the overlapped operation costs. In an embodiment, the database server generates a query cost list and initially stores the first database operation from the set of ordered database operations into the query cost list. For example, if the first database operation in the set of ordered database operations is a system-wide partitioning operation, herein referred to as SYS-PART, which partitions the data across different machines, then the database server would insert the SYS-PART operation into the query cost list. The database server also stores, within the query cost list, the cost type associated with the SYS-PART operation and the calculated operation cost value for the SYS-PART operation.

At block 110, the database server determines whether there are additional database operations from the set of ordered database operations that need to be added to the query cost list. In an embodiment, the query-level cost model is configured to process each database operation in the set of ordered database operations to determine the operation cost for the requested query, accounting for overlapping operations. If there are remaining database operations in the set of ordered operations, then the database server proceeds to block 115 to evaluate next database operation in the set of ordered database operations. If there are no more database operations to be evaluated, then the database server proceeds to block 135 to calculate the query operation cost using the database operations and their respective costs stored in the query cost list.

At block 115, the database server selects the next database operation from the set of ordered operations. For example, if the next database operation is an expression operation, referred to as EXPR-1, which evaluates expressions over loaded data, then the database server would select the EXPR-1 operation and proceed to block 120.

At block 120, the database server determines whether the operation cost of the currently selected database operation can be overlapped with the last database operation loaded into the query cost list, herein referred to as a last query cost operation. In an embodiment, database operations may be overlapped if their associated cost types are different. For example, if the currently selected database operation, EXPR-1 has a cost type as CPU and the last query cost operation, SYS-PART, has a cost type as NETWORK, then the two database operations may be overlapped for operation cost calculation purposes. Database operations that have different cost types may be overlapped because each database operation, based on their cost type, may use distinct computing components within the database server. Therefore after starting a particular database operation, other components may be used to process another database operation if the components needed are not currently being used by the previous database operation. Using the previous example, the NETWORK operation, SYS-PART, may include a network transmission of data to other server nodes using network interface components. Once the data to be transmitted is processed, the network interfaces transmit the data across the network. During the time the data is being transmitted by the network interfaces, the CPU may be free to process the next database operation, EXPR-1. Since EXPR-1 requires CPU resources to process the expression, the CPU resource may begin processing EXPR-1 while the network interfaces are still transmitting SYS-PART, thus overlapping the two database operations.

If however, at block 120, the database server determines that the current database operation and the last query cost operation have the same operation cost type, then the two database operations cannot be overlapped. For example, if the last query cost operation is SYS-PART having operation cost type NETWORK, and the current database operation is an archiving operation, with an operation cost type of NETWORK, that sends data to an archiving server, then the two database operations cannot be overlapped because the two database operations require the same network interfaces to transmit data and therefore cannot be performed asynchronously.

Additionally, operation costs for database operations may only be overlapped if the current database operation does not depend on output from the last query cost operation. If the current database operation depends on output from the last query cost operation, then the current database operation may not begin until the last query cost operation has completed and produced output for the current database operation to proceed. Using the existing example, if EXPR-1 depends on data from SYS-PART, then EXPR-1 may not proceed until SYS-PART has completed processing. Therefore the operating costs of EXPR-1 may not be overlapped with the operating costs of SYS-PART.

In an embodiment, if at block 120 the database system determines that the two database operations may be overlapped, then the database system proceeds to block 125 to calculate overlap operation costs and recalculate operation costs accounting for the overlap. At block 125, the database system recalculates operation costs for the current database operation and the last query cost operation. In an embodiment, the database server calculates the overlap operation cost as a HYBRID cost that represents the operation cost value that may be overlapped between the current database operation and the last query cost operation. For example, if the current database operation EXPR-1 has an operation cost value of 50 and the last query cost operation, SYS-PART, has an operation cost value of 100, then the maximum operation cost value that may be overlapped between the two database operations is 50 because the total operation cost value for EXPR-1 is 50. Therefore the database system is configured to assign the overlap operation cost value of 50 as a HYBRID cost type.

The database server is further configured to recalculate the operation cost values for the current database operation and the last query cost operation taking into account the calculated operation cost value for the HYBRID cost type. Using the previous example, the operation cost value for either the current database operation or the last query cost operation is replaced by the HYBRID cost value. In an embodiment, the database server determines which operation cost value of the current database operation or the last query cost operation is replaced by the HYBRID cost value based on which operation cost value contains a lesser value between the current database operation and the last query cost operation. Using the previous example, the operation cost value of current database operation (EXPR-1) is 50 and the operation cost value of the last query cost operation (SYS-PART) is 100. Since the current database operation (EXPR-1) contains an operation cost value that is less than the last query cost operation, the database server replaces the operation cost value for EXPR-1 with a HYBRID operation cost value of 50. The entire operation cost value may be replaced with the calculated hybrid cost value because the entire operation cost may be executed in parallel with the last query cost operation.

In an embodiment, the remaining operation cost value for the other database operation is calculated as the difference between the original operation cost value and the calculated HYBRID operation cost value. Using the previous example, the last query cost operation (SYS-PART) contained the larger operation cost value of 100. Since 50 of the 100 operation cost value for SYS-PART is overlapped with the current database operation (EXPR-1), the updated operation cost value is calculated as the difference of the original operation cost value (100) and the hybrid cost value (50), which then equals to an updated operation cost value for SYS-PART as 50.

The following table illustrates the operation cost values before applying overlapped operation costs and the operation cost values after applying overlapped operation costs.

| Operation Cost - Before Operation Overlaps | | |
| --- | --- | --- |
| DATABASE OPERATION | OPERATION TYPE | OPERATION COST VALUE |
| Current Database Operation EXPR-1 | CPU | 50 |

Operation Cost - Before Operation Overlaps

| DATABASE OPERATION | OPERATION TYPE | OPERATION COST VALUE |
|---|---|---|
| Last Query Cost Operation SYS-PART | NETWORK | 100 |
| Current Database Operation EXPR-1 | HYBRID | 50 |
| Last Query Cost Operation SYS-PART | NETWORK | 50 |

As illustrated, the two database operations, EXPR-1 and SYS-PART may be overlapped to generate an overlapped operation cost value of 50 and updating the operation cost value for SYS-PART from 100 to 50. In an embodiment, the updated operation cost value and the updated operation cost type for the last query cost operation is updated in the query cost list. Using the previous example, the query cost list would be updated to reflect the updated operation cost value of 50 for SYS-PART.

Referring back to FIG. 1, at block 130 the current database operation is added to the query cost list. In an embodiment, the database server adds the current database operation to the query cost list, including the operation cost type and operation cost value. After adding the current database operation to the query cost list, the current database operation now becomes the database operation designated as the last query cost operation. For example after calculating the updated operation costs at block 125, the database server adds the current database operation EXPR-1 to the query cost list and its operation cost type and value as (HYBRID, 50). If at block 120, the database server concluded that the current database operation and the last query cost operation cannot be overlapped, then the database server would add the current database operation with its originally calculated operation cost value to the query cost list. After adding the current database operation EXPR-1 to the query cost list, EXPR-1 now becomes the last query cost operation for future overlap cost determinations.

In an embodiment, after adding the current database operation to the query cost list, the database server proceeds back to block 110 to evaluate remaining database operations from the inputted query plan. At block 110, if there are no more database operations in the query plan, then the database server proceeds to block 135 to calculate the operation cost for the entire query plan incorporating overlap costs. In an embodiment, the database server calculates the operation cost of the requested query by aggregating the operation cost values for database operations in query cost list. For example, if the query cost list contained database operations with operation cost values:

[SYS-PART, {NETWORK, 50},
EXPR-1, {HYBRID, 50},
HASH-AGG, {CPU, 70},
JOIN, {CPU, 150}]

then the database server would aggregate the operation cost values as (50+50+70+150) to equal a total query cost value for the query as 320. This query cost value may be used to evaluate execution orders for different query plans.

Figure 2:
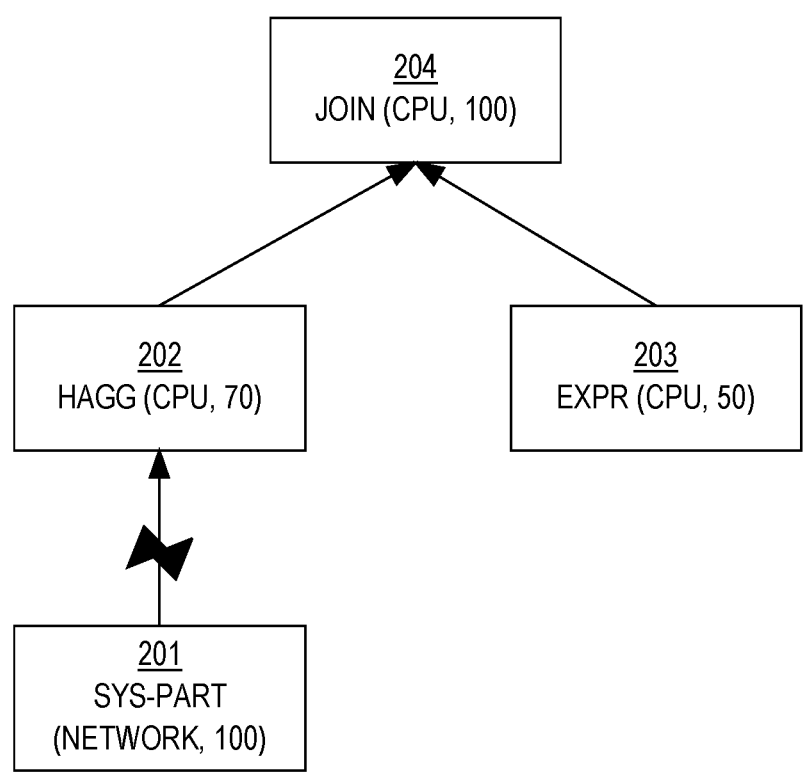
FIG. 2 depicts an example query operator tree with individual database operations graphed according to their dependencies on one another.

In an embodiment, the database server may be configured to evaluate differently ordered query plans to determine which query plan is more efficient based upon operation cost. FIG. 2 depicts an example query operator tree with individual database operations graphed according to their dependencies on one another. The query tree shows that database operation 202, entitled HAGG, is dependent on database operation 201, SYS-PART, and database operation 204, JOIN, is dependent on database operations 202 and 203. Therefore based on the dependencies there are two possible execution orders for the database operations. The first order includes performing 201, 202, 203, and then 204. The second order includes performing 201, 203, 202, and then 204. Using the query-level cost model, the database server may determine the operation cost for the two possible query plans in order to determine which query plan is most efficient in terms of operation cost.

Referring back to FIG. 1, the database server may use the query-level cost model to calculate the operation cost for the first execution order [201, 202, 203, 204]. At block 105, the database server initializes the query cost list and inserts the first database operation 201 with a cost type of NETWORK and an operation cost value of 100. The database server then determines at block 110 that additional database operations exist and at block 115 selects the next database operation (Y02). At block 120 the database server determines whether 202 and 201 may be overlapped. Since 202 depends on output from 201, the two database operations may not be overlapped. The database server proceeds to block 130 and inserts 202 into the query cost list with a cost type of CPU and an operation cost value of 70.

The database server proceeds to block 110 and determines that additional database operations still exist in the first execution order and at block 115 the database server selects database operation 203. At block 120, the database server determines whether the last query cost operation, which is currently 202, and 203 may be overlapped. Since 202 and 203 have the same operation cost type, CPU, the two database operations cannot be overlapped. Therefore the database server proceeds to block 130 and inserts 203 in the query cost list with a cost type of CPU and an operation cost value of 50.

The database server proceeds to block 110 and determines that an additional database operation exists in the first execution order and at block 115 the database server selects database operation 204. At block 120, the database server determines whether the last query cost operation, which is currently 203, and 204 may be overlapped. Since 204 depends on the output from 203, the two database operations may not be overlapped. The database server proceeds to block 130 and inserts 204 into the query cost list with a cost type of CPU and an operation cost value of 150. The database server proceeds back to block 110 and determines whether additional database operations exist in the first execution order. Since there are no more database operations in the first execution order, the database server proceeds to block 135 to calculate the query operation cost based on the compiled query cost list. The query cost list contains the following database operations and their operation cost values:

[201, {NETWORK, 100},
202, {CPU, 70},
203, {CPU, 50},
204, {CPU, 150}]

Based on the database operations in the query cost list the operation cost value for the first execution order is 370.

The database server may then calculate the operation cost value for the second execution order [201, 203, 202, 204]

using the query-level cost model. Referring again to FIG. 1, at block 105, the database server initializes the query cost list and inserts the first database operation 201 with a cost type of NETWORK and an operation cost value of 100. The database server then determines at block 110 that additional database operations exist and at block 115 selects the next database operation (203). At block 120 the database server determines whether 203 and 201 may be overlapped. Since 203 does not depend on output from 201 and the operation cost types for 203 (CPU) and 201 (NETWORK) are different, the two database operations may be overlapped. At block 125, the database server determines the overlap cost and updates the operation cost values for both 201 and 203. Based on the original operation cost values of, 201=100 and 203=50, the HYBRID overlap cost value equals 50. The database server also updates the operation cost values of 201 to now equal 50 and 203 to now equal the HYBRID cost value of 50. The database server updates the operation cost value for 201 in the query cost list to reflect the update value of 50.

The database server proceeds to block 130 and inserts 203 into the query cost list with a cost type of HYBRID and an operation cost value of 50. The database server then proceeds to block 110 and determines that additional database operations still exist in the first execution order and at block 115 the database server selects database operation 202. At block 120, the database server determines whether the last query cost operation, which is currently 203, and 202 may be overlapped. Since 202 has an operation cost type of CPU and 203 originally had an operation cost type of CPU, the two database operations cannot be overlapped because the two database operations have the same operation cost type. Therefore the database server proceeds to block 130 and inserts 202 in the query cost list with a cost type of CPU and an operation cost value of 70.

The database server proceeds to block 110 and determines that an additional database operation exists in the second execution order and at block 115 the database server selects database operation 204. At block 120, the database server determines whether the last query cost operation, which is currently 202, and 204 may be overlapped. Since 204 depends on the output from 202, the two database operations may not be overlapped. The database server proceeds to block 125 and inserts 204 into the query cost list with a cost type of CPU and an operation cost value of 150. The database server proceeds back to block 110 and determines whether additional database operations exist in the first execution order. Since there are no more database operations in the second execution order, the database server proceeds to block 135 to calculate the query operation cost based on the compiled query cost list. The query cost list contains the following database operations and their operation cost values:

[Y01, {NETWORK, 50},
Y03, {HYBRID, 50},
Y02, {CPU, 70},
Y04, {CPU, 150}]

Based on the database operations in the query cost list the operation cost value for the second execution order is 320.

Using the query-level cost model, the database server determines that the second execution order is more efficient than the first execution order based upon the overall operation cost value of the query.

Operation Scheduling

In an embodiment, the database server may be configured to compute an optimized query plan execution order for a set of database operations that make up a particular query. For example, for a given query that is made up of a set of database operations, multiple execution orders may exist. Determining an optimal execution order may include iteratively implementing the query-level cost model, as described above, to determine the optimal execution order.

Figure 3:
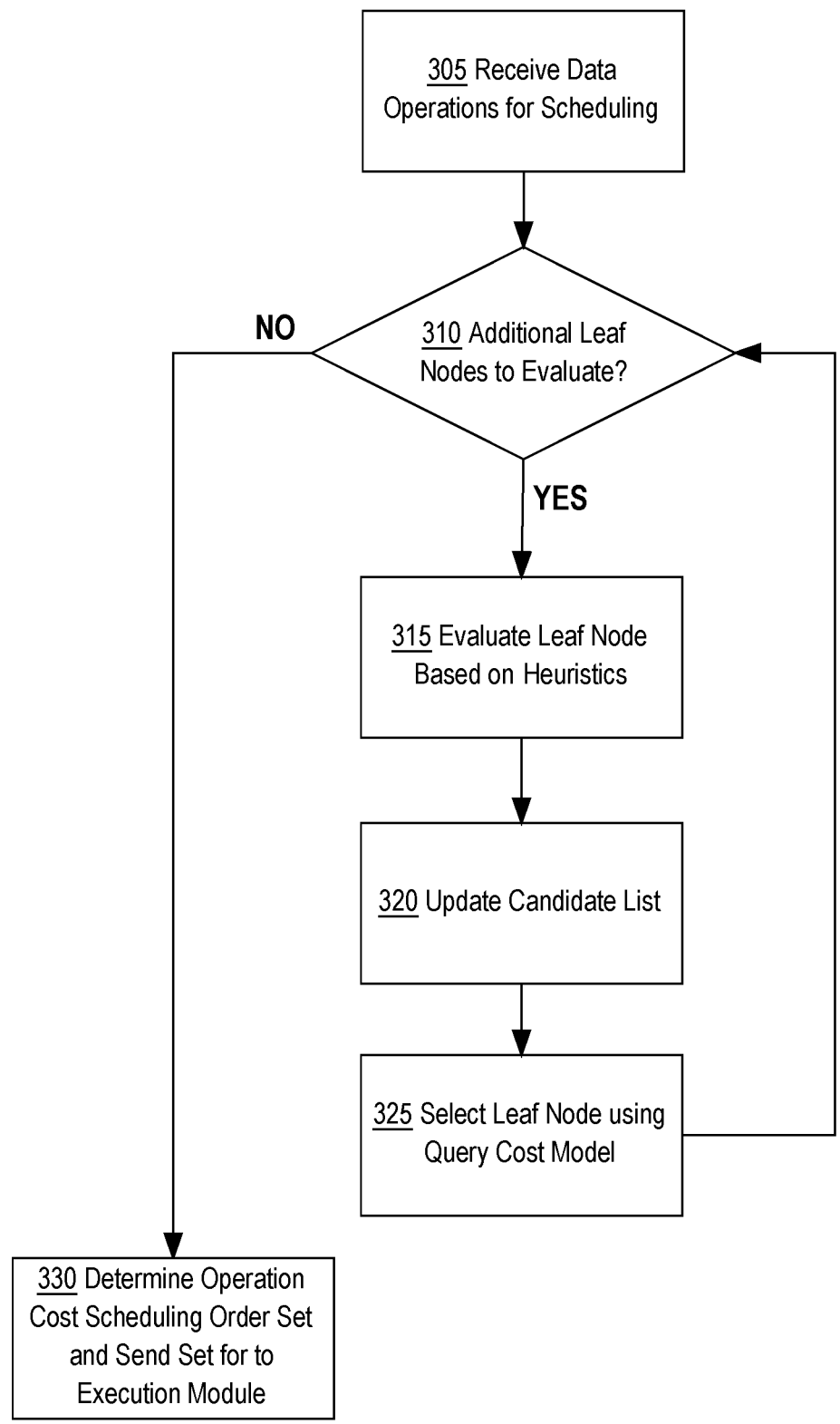
FIG. 3 depicts an example embodiment of a flowchart for determining an optimized query plan execution order.

FIG. 3 depicts an example embodiment of a flowchart for determining an optimized query plan execution order. At block 305, the data server receives, as input, a set of database operations that make up the requested query. For example, a particular query may be divided into a set of database operations including, but not limited to, system partitions, hash aggregation operations, expression evaluation operations, and join operations. In an embodiment, the input set of database operations may be organized within a data structure that expresses data dependencies between the different database operations. For example, the input set of database operations may be organized within a directed acyclic graph, where each database operation represents a node within the graph. Other embodiments may include different types of graphs of hierarchal trees that contain dependency information for the set of database operations that make up the requested query.

In an embodiment, operation costs and cost types for each database operation in the set of database operation may be pre-calculated and included within property data for the input set of database operations. In another embodiment, the database server may be configured to evaluate the input set of database operations and assign an operation cost and cost type to each database operation within the input set of database operations.

In an embodiment, at block 305, the database server may be configured to generate an operation node scheduling order list. The operation node scheduling order list represents an optimized scheduling order for executing the database operations that make up the requested query. As the database server evaluates database operations, the database operations are inserted into the operation node scheduling order list in the desired optimal order for execution.

Figure 4:
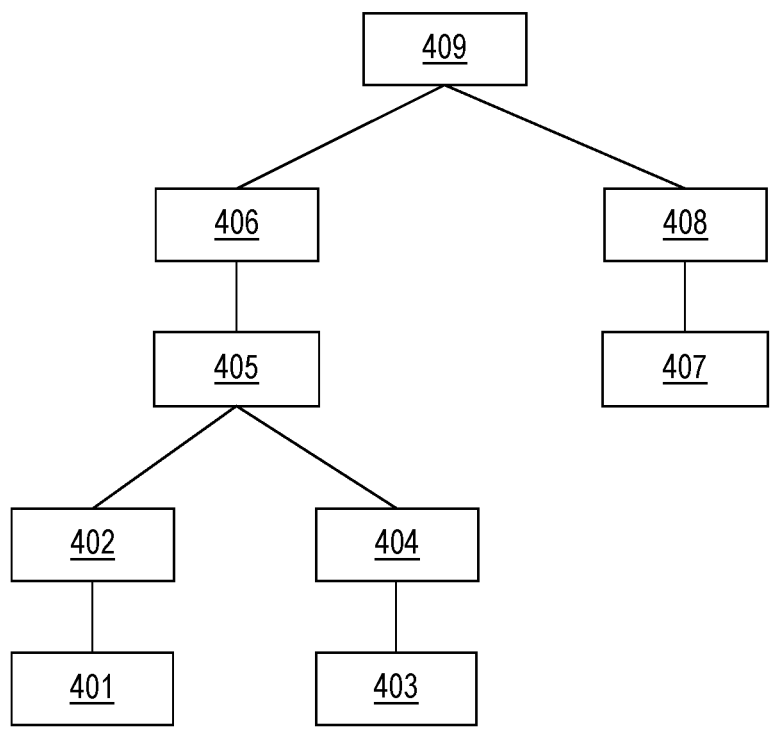
FIG. 4 depicts an example input set of database operations for a requested query.

In an embodiment, the database server is configured to determine a candidate set of leaf node database operations from the input set of database operations. The leaf node database operations refer to database operations that have no dependencies on other database operations, other than operations that have already been scheduled, for example operations that have already been inserted into the operation node scheduling order list. FIG. 4 depicts an example input set of database operations for a requested query. The example input set of database operations is represented as a directed acyclic graph of nodes, which each represent a specific database operation of the requested query. Using FIG. 4 as an example, the database server determines the candidate set of leaf node database operations as [401, 403, 407]. These nodes are identified as leaf nodes because each of the nodes has no dependencies on other nodes within the graph.

Referring back to FIG. 3, at block 310 the database server determines whether leaf nodes, in the candidate set of leaf nodes, need to be evaluated and scheduled within the operation node scheduling order list. If leaf nodes exist within the candidate set of leaf nodes, then the database server proceeds to block 315 to evaluate the set of leaf nodes based on configured heuristics.

Evaluate Nodes Based on Heuristics

In an embodiment, the database server may be configured with a set of heuristic rules that are used to automatically schedule specific types of database operations. For example, heuristic rules may include, but are limited to: rules configured to automatically schedule subsequent database operations that overlap cost types, rules configured to reduce the cache size based on intermediate results, and rules configured to limit the size of network buffer.

In an embodiment, the database server may be configured with a network overlap rule that promotes overlapping network costs. For example, if the last cost element inserted into the operation node scheduling order set has a NETWORK cost type and if eligible leaf nodes, in the candidate set of leaf nodes, that are not dependent on the last element cost and have a different cost type, then the eligible leaf nodes should be inserted into the operation node scheduling order set. For example, if node 401, which has a cost type of NETWORK, has been inserted into the operation node scheduling order set and node 403 is a leaf node that does not depend on 401 and has a cost type of CPU, then based on the network overlap rule the database server would insert node 403 into the operation node scheduling order set.

In an embodiment, the database server may be configured with a rule to reduce intermediate result size that favors scheduling nodes that include operations that require input from existing intermediate results rather than generating additional intermediate results. For example, if two JOIN operations exist in the requested query, this rule would promote scheduling a node that completes one JOIN operation over scheduling a node that generates additional intermediate results by another JOIN operation.

In an embodiment, the database server may be configured with a limited network buffer rule configured to limit the amount of network buffer allocated based on the guaranteed amount of available network buffer in the database server. For example if a leaf node requires usage of more network buffers than the network buffer guaranteed to be available by the database server at any given point in time, then the limited network buffer rule may deprioritize that specific leaf node from being scheduled. In other embodiments, the database server may be configured with additional rules to determine the scheduling order of available leaf node.

In an embodiment, the database server may schedule one or more leaf nodes based on the available heuristics. Using the FIG. 4 example, the current candidate set of leaf nodes may contain nodes [401, 403, 407] and based on the available heuristics, the database server may schedule node 401. The database server may then insert node 401 into the operation node scheduling order set and remove the inserted node 401 from the input set of database operations. After inserting node 401 into the operation node scheduling order set, the candidate set of leaf nodes may be updated to include new leaf nodes that may be available based on scheduling the inserted node 401.

At block 320, the database server updates the candidate set of leaf nodes. In an embodiment, the database server re-evaluates the input a set of database operations for any new leaf nodes. For example, after node 401 was removed from the input set of database operations and scheduled in the operation node scheduling order set, node 402 would then become a leaf node because node 402 does not depend on any other leaf nodes in the input set of database operations. As a result, the current candidate set of leaf nodes would include nodes [402, 403, 407].

Evaluate Nodes Based on Query-Cost Model

At block 325, the database server evaluates the candidate set of leaf nodes using the query-cost model. In an embodiment, the database server calculates query cost between the last node in the operation node scheduling order set and the available leaf nodes in the candidate set of leaf nodes. Using the previous example, the database server evaluates each of the leaf nodes against the last node in the operation node scheduling order, which in this case is node 401, based on operation costs. For instance node pairs (401,402), (401, 403), and (401, 407) are evaluated using the query-cost model, previously described, in order to determine potential overlap costs and determine the lowest overall cost between each of the node pairs. If the database server determines that the most cost efficient node pair is (401, 403) then the database server is configured to insert node 403 into the operation node scheduling order set and remove node 403 from the candidate set of leaf nodes and the input set of database operations. Additionally, the database server is configured to calculate the overlap cost and updated costs for both nodes 401 and 403 and update the operation cost values and operation cost types within the operation node scheduling order set.

In another embodiment, the database server may be configured to determine operation costs using the query-cost model for multiple levels of leaf nodes. When determining the query-cost model for neighboring nodes between node 401 and leaf nodes [402, 403, 407], the database server may be configured to determine an additional set of candidate leaf nodes based upon choosing each of the current leaf nodes and then evaluating future node pairs. For example, when evaluating the query-cost for node pairs (401,402), (401,403), and (401, 407), the database server may also generate a 407-based temporary candidate set of leaf nodes. The 407-based temporary candidate set of leaf nodes would contain nodes that would be leaf nodes if node 407 was chosen to be scheduled. The 407-based temporary candidate set of leaf nodes may then include [402, 403, 408]. The database server may then iteratively calculate query-cost for the 407-based temporary candidate set of leaf nodes under the assumption that node 407 has been scheduled. The database server may calculate temporary candidate sets for each of the current leaf nodes in order to generate a multi-level query-cost model in order to determine which node from the current candidate set of leaf nodes is the most cost efficient.

In yet other embodiments, the database server may be configured to generate temporary query-cost models that traverse multiple levels generating multiple operation node scheduling orders in order to determine which nodes should be scheduled next based upon all ordering permutations available.

In an embodiment, upon determining which leaf to insert into the operation node scheduling order set next, the database server inserts the leaf node into the operation node scheduling order set and removes the leaf node from the candidate set of leaf nodes and the input set of database operations. For example, if from the candidate set of leaf nodes [402, 403, 407] the query-cost model indicated that node 403 should be scheduled next, then the database server inserts node 403 into the operation node scheduling order set and removes node 403 from the candidate set of leaf nodes and the input set of database operations.

The database server then proceeds back to block 310 to iteratively evaluate the current candidate set of leaf nodes. In an embodiment, the database server continues evaluating the leaf nodes in the candidate set of leaf nodes until all nodes have been scheduled. This evaluation may involve repeating the steps described in blocks 315-325 until all nodes in the candidate set of leaf nodes and the input set of database operations has been scheduled in the operation node scheduling order set. If at block 310, the database server determines that there are no more leaf nodes to evaluate, then the database server proceeds to block 330 to determine the operation cost and to send the generated operation node scheduling order set to the query execution module for query execution. For example, using configured heuristics and the query-cost model, the database server may generate an operation node scheduling order set that includes a scheduling order of [401, 403, 404, 407, 408, 402, 405, 406, 409], then the database server may send the operation node scheduling order set to query execution module for query execution across one or more server nodes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
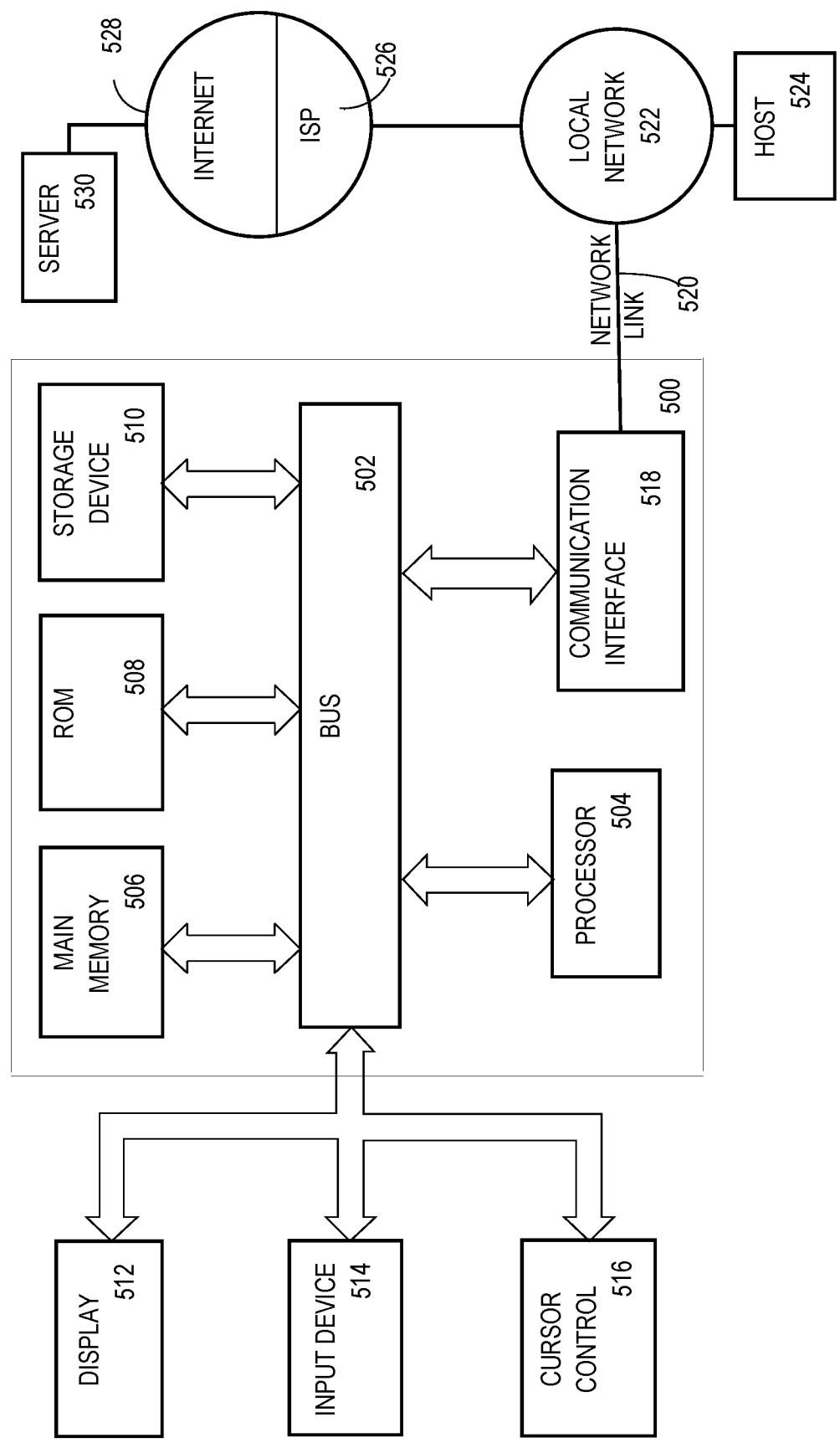
FIG. 5 depicts a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving a set of data processing operations for a query, wherein the set of data processing operations are organized as operation nodes each representing a data processing step required for the query;

for each operation node of the set of data processing operations:

calculating an operation cost for performing operations specified in an operation node by determining a duration to complete the operations specified in the operation node;

calculating an operation type for the operations associated with the operation node, wherein the operation type represents a type of computing resource needed to perform the operations associated with the operation node;

selecting and inserting a particular operation node from the set of data processing operations into an operation node scheduling order set based on one or more properties of the particular operation node, wherein the operation node scheduling order set is an ordered set of the operation nodes ordered based on an insertion order of the operation nodes;

removing the particular operation node from the set of data processing operations; executing iterative cost operations for subsequent iterations to insert operation nodes into the operation node scheduling order set, wherein for each iteration of the iterations:

determining a set of leaf nodes from the set of data processing operations, wherein the set of leaf nodes comprise a subset of operation nodes from the set of data processing operations that are not dependent on execution of other operation nodes within the set of data processing operations;

determining whether a current leaf node is dependent on operations within a last node inserted into the operation node scheduling order set and whether the operation type of the current leaf node is different from the operation type of the last node; if the current leaf node is different from the operation type of the last node and the current leaf node is not dependent on the operations within the last node, then:

calculating a hybrid cost for the current leaf node by determining an overlap value based on the lesser cost of the operation cost of the current leaf node and the operation cost of the last node; if the operation cost of the current leaf node is less than the operation cost of the last node, then calculating the updated operation cost of the current leaf node to equal the hybrid cost and calculating the updated operation cost of the last node to equal a difference of the operation cost of the last node and the hybrid cost;

if the operation cost of the current leaf node is greater than the operation cost of the last node, then calculating the updated operation cost of the last node to equal the hybrid cost and calculating the updated operation cost of the current leaf node to equal a difference of the operation cost of the current leaf node and the hybrid cost;

inserting the current leaf node into operation node scheduling order set, wherein the particular leaf node includes the hybrid cost of the current leaf node;

removing the current leaf node from the set of data processing operations; and sending the operation node scheduling order set to a query execution plan processing system.

2. The method of claim 1, wherein the set of data processing operations is a directed acyclic graph of data operations, wherein edges within the directed acyclic graph represent data dependencies between the operation nodes.

3. The method of claim 1, wherein for each operation node of the set of data processing operations, the type of computing resource needed to perform the operations associated with the operation node that represents the operation type is the type of computing resource that is projected to take most amount of time to complete within the operation node.

4. The method of claim 1 further comprising:
wherein for each iteration of the iterations:
if the operation cost of the current leaf node was updated to the hybrid cost, then updating the operation type of the particular leaf node to hybrid; and
if the operation cost of the last node was updated to the hybrid cost, then updating the operation type of the last node to hybrid.

5. The method of claim 1, further comprising:
determining whether one or more leaf nodes match one or more configured heuristic rules;
if the one or more leaf nodes match the one or more configured heuristic rules, then: inserting the one or more leaf nodes into the operation node scheduling order set; removing the one or more leaf nodes from the set of data processing operations; and
determining if additional leaf nodes exist from the set of data processing operations and inserting the additional leaf nodes into the set of leaf nodes.

6. One or more non-transitory computer-readable media storing instructions which, when executed by one or more processors, cause:
receiving a set of data processing operations for a query, wherein the set of data processing operations are organized as operation nodes each representing a data processing step required for the query;
for each operation node of the set of data processing operations:
calculating an operation cost for performing operations specified in an operation node by determining a duration to complete the operations specified in the operation node;
calculating an operation type for the operations associated with the operation node, wherein the operation type represents a type of computing resource needed to perform the operations associated with the operation node;
selecting and inserting a particular operation node from the set of data processing operations into an operation node scheduling order set based on one or more properties of the particular operation node, wherein the operation node scheduling order set is an ordered set of the operation nodes ordered based on an insertion order of the operation nodes;
removing the particular operation node from the set of data processing operations;
executing iterative cost operations for subsequent iterations to insert operation nodes into the operation node scheduling order set, wherein for each iteration of the iterations:
determining a set of leaf nodes from the set of data processing operations, wherein the set of leaf nodes comprise a subset of operation nodes from the set of data processing operations that are not dependent on execution of other operation nodes within the set of data processing operations;
determining whether a current leaf node is dependent on operations within a last node inserted into the operation node scheduling order set and whether the operation type of the current leaf node is different from the operation type of the last node;
if the current leaf node is different from the operation type of the last node and the current leaf node is not dependent on the operations within the last node, then:
calculating a hybrid cost for the current leaf node by determining an overlap value based on the lesser cost of the operation cost of the current leaf node and the operation cost of the last node;
if the operation cost of the current leaf node is less than the operation cost of the last node, then calculating the updated operation cost of the current leaf node to equal the hybrid cost and calculating the updated operation cost of the last node to equal a difference of the operation cost of the last node and the hybrid cost;
if the operation cost of the current leaf node is greater than the operation cost of the last node, then calculating the updated operation cost of the last node to equal the hybrid cost and calculating the updated operation cost of the current leaf node to equal a difference of the operation cost of the current leaf node and the hybrid cost;
inserting the current leaf node into operation node scheduling order set, wherein the particular leaf node includes the hybrid cost of the current leaf node;
removing the current leaf node from the set of data processing operations; and
sending the operation node scheduling order set to a query execution plan processing system.

7. The one or more non-transitory computer-readable media of claim 6, wherein the set of data processing operations is a directed acyclic graph of data operations, wherein edges within the directed acyclic graph represent data dependencies between the operation nodes.

8. The one or more non-transitory computer-readable media of claim 6, wherein for each operation node of the set of data processing operations, the type of computing resource needed to perform the operations associated with the operation node that represents the operation type is the type of computing resource that is projected to take most amount of time to complete within the operation node.

9. The one or more non-transitory computer-readable media of claim 6 wherein the instructions, when executed by the one or more processors, further cause:
wherein for each iteration of the iterations:
if the operation cost of the current leaf node was updated to the hybrid cost, then updating the operation type of the particular leaf node to hybrid; and
if the operation cost of the last node was updated to the hybrid cost, then updating the operation type of the last node to hybrid.

10. The one or more non-transitory computer-readable media of claim 6 wherein the instructions, when executed by the one or more processors, further cause:
determining whether one or more leaf nodes match one or more configured heuristic rules;
if the one or more leaf nodes match the one or more configured heuristic rules, then:
inserting the one or more leaf nodes into the operation node scheduling order set;
removing the one or more leaf nodes from the set of data processing operations; and determining if additional leaf nodes exist from the set of data processing operations and inserting the additional leaf nodes into the set of leaf nodes.

\* \* \* \* \*